March 30, 1943.    G. E. DONO    2,315,404
WATER, OIL, OR OTHER LIQUID COOLER
Filed Dec. 28, 1940

Inventor
G. E. Dono
By: Glascock Downing & Seebold
Attys.

UNITED STATES PATENT OFFICE 2,315,404

WATER, OIL, OR OTHER LIQUID COOLER

George Edward Dono, Oxford, England, assignor to Morris Motors Limited, Oxford, England Application December 28, 1940, Serial No. 372,131
In Great Britain December 15, 1939

1 Claim. (Cl. 257—130)

This invention relates to water, oil or other liquid coolers for use in conjunction with aircraft, road vehicle and other engines and for other purposes, and of the kind comprising a plurality of thin metal tubes and perforated thin metal gill plates through which the tubes are inserted, the ends of the tubes being connected to inlet and outlet headers. The tubes form passages for the liquid to be cooled and the spaces between the tubes and gill plates form passages for cooling air.

When such a cooler is required to operate under considerable internal pressure difficulty is experienced in making the headers sufficiently strong to withstand the pressure without using walls of undesirable thickness and weight. The object of the present invention is to enable this difficulty to be overcome in a simple and satisfactory manner.

The invention comprises a liquid cooler of the kind aforesaid in which the headers are reinforced by means of stay bolts.

Figure 1:
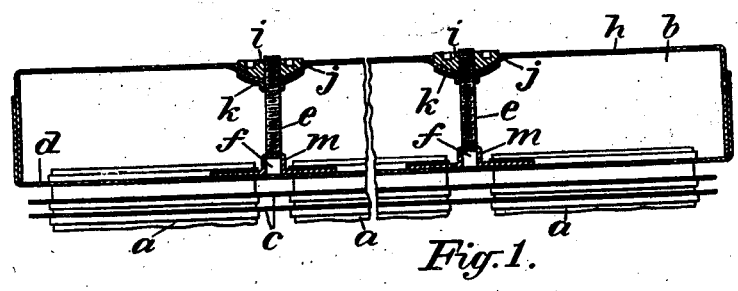
Figure 2:
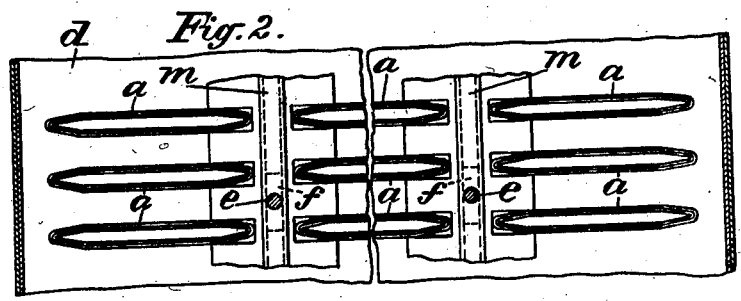

In the accompanying sheet of explanatory drawings:

Figures 1 and 2 are respectively a sectional side elevation and a fragmentary sectional plan of a part of a liquid cooler embodying the invention.

In the drawing $a$ indicates the thin metal tubes through which the liquid to be cooled can flow between the inlet and outlet headers as $b$ to which the ends of the tubes are secured, and $c$ indicates the thin metal gill plates through which the tubes are inserted and which together with the tubes form passages for the cooling air.

In carrying the invention into effect a plurality of channel members $m$ are secured to the inner flanged plate as $d$ to which the ends of the tubes $a$ are secured. The channel members are arranged in the headers $b$ so that the open sides of the channels are closed by the corresponding plates and said members are formed in their closed sides or bases with holes through which stay bolts $e$ are inserted. Rectangular heads $f$ on the bolts $e$ are accommodated in the channels of the channel members $m$.

In each of the other or outer flanged plates as $h$, which with the tube plates as $d$ forms the headers as $b$, I form a corresponding number of holes to receive the other ends of the bolts $e$ which are screw-threaded and are fitted with nuts $i$ which can be tightened on to the outer surface of the adjacent plate $h$. Preferably each plate $h$ is formed with a recess $j$ at each of the positions where a hole is formed, the recess being adapted to receive the nut $i$ on the corresponding bolt end so as to avoid any material projection of the bolt end and nut beyond the outer surface of the plate. After each nut $i$ has been screwed on to the end of its bolt $e$ and into the adjacent recess $j$ in the corresponding plate $h$, the nut is secured to this plate by solder. To prevent the solder from entering the headers as $b$ through the bolt holes in the plates as $h$, a metal washer $k$ may be screwed on to the end of each bolt $e$ before the bolt end is inserted through its hole in the corresponding plate $h$, this washer being shaped to a concavo-convex form for accommodating the corresponding plate recess $j$.

Headers reinforced by stay bolts as above described can be made light and at the same time strong enough to resist injurious distortion by the internal pressure to which the headers may be subjected in service.

The invention is not limited to the examples above described as subordinate details may be varied to suit requirements.

Having thus described my invention what I claim as new and desire to secure by Letters Patent is:

In a liquid cooler, the combination of, a header formed of relatively thin sheet material adapted to receive liquid under considerable pressure, one wall of said sheet material having openings therein, a plurality of tubes formed of relatively thin sheet material connected to said side wall with each tube in communication with the interior of the header, channel members secured to an inner surface of the wall of sheet material adjacent ends of said tubes, threaded reinforcing stay bolts connected to said channel members and extending through holes in the opposite wall of said sheet material forming the header, the sheet material adjacent each of said holes being inwardly depressed forming a recess around each hole, and a nut threaded on each bolt with each nut engaging the sheet material within a respective recess whereby outward distortion of the sheet material walls is substantially prevented without materially increasing the weight of the cooler.

GEORGE EDWARD DONO.